June 4, 1946.  J. C. JUNKIN  2,401,568
SPRING ASSEMBLY FOR VEHICLE WHEELS
Filed May 16, 1944
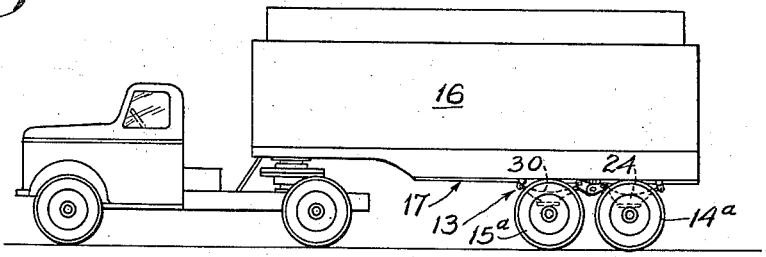
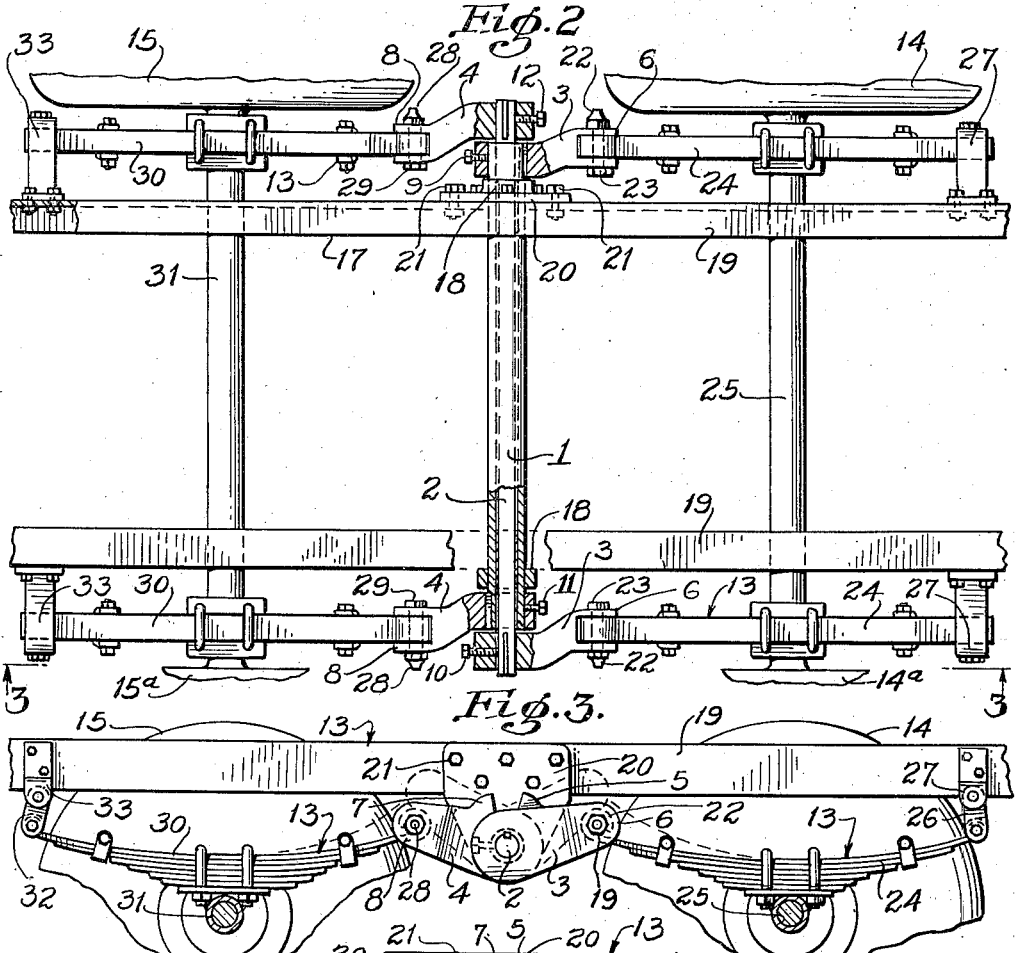
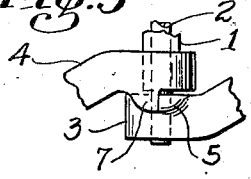
INVENTOR,
John C. Junkin
BY
ATTORNEY.

Patented June 4, 1946

2,401,568

UNITED STATES PATENT OFFICE 2,401,568

SPRING ASSEMBLY FOR VEHICLE WHEELS

John Charles Junkin, San Diego, Calif.

Application May 16, 1944, Serial No. 535,825

3 Claims. (Cl. 280—104.5)

This invention relates to a spring assembly for vehicle wheels, and more particularly to a dual rocker connection for the semi-elliptic springs for the wheels of semi-trailers and trucks.

The general object of the invention is to provide a spring assembly of the character stated for spring mounting a vehicle on two pairs of wheels in such manner as to provide independent spring action of the wheels on the sides, respectively, of the vehicle, and related spring action of the wheels positioned in biased relation or diagonally on opposite sides of the vehicle, for balancing the vehicle and maintaining the same in transverse vertical alignment.

A more particular object is to provide a dual rocker connected spring assembly for mounting a vehicle on two pairs of wheels in such manner that the torque of each rock shaft to which are connected the springs of two biased positioned wheels, functions as a shock absorber between said wheels on opposite sides of the vehicle, when one of said wheels travels over a raised portion of a road.

Other objects and advantages will appear hereinafter as this specification progresses.

The invention consists in the novel and useful provision, formation, construction, association, and relative arrangement of parts, members and features, all as shown in one embodiment in the accompanying drawing, described generally, and more particularly pointed out in the claims.

In the drawing:

Figure 1 is a side elevation of a semi-trailer mounted at its forward end on a truck, embodying my invention, Figure 2 is a plan view, partly in section, on an enlarged scale, of my invention shown applied to the chassis and springs of a semi-trailer, Figure 3 is a longitudinal vertical section on line 3—3 of Figure 2, Figure 4 is a side view of the rock shafts and spring connecting arms showing inter-engaging stops on said arms in position limiting the action of the wheel springs of a semi-trailer, and, Figure 5 is a fragmentary plan of Figure 4.

Referring more particularly to the drawing, in which corresponding parts are designated by the same reference characters in all of the figures, my invention includes a pair of rock shafts 1 and 2, a pair of rock shaft connecting arms 3, and a pair of rock shaft connecting arms 4, each arm 3 being formed with a stop lug 5 on its upper edge and with a forked outer end 6, and each arm 4 being formed with a stop lug 7 on its upper edge and with a forked outer end 8. The rock shaft 1 is tubular in form, while the rock shaft 2 is extended through and turnably fitted in said tubular rock shaft 1, with the ends of the rock shaft 2 extending a short distance beyond the ends, respectively, of the rock shaft 1. One of the rock shaft connecting arms 3 is adjustably secured, by means 9, on one end of the tubular rock shaft 1, while the other rock shaft connecting arm 3 is adjustably secured by means 10, on the opposite end of the rock shaft 2. One of the rock shaft connecting arms 4 is adjustably secured, by means 11, on the other end of the tubular rock shaft 1, while the other rock shaft connecting arm 4 is adjustably secured, by means 12, on the opposite end of the rock shaft 2.

My invention is embodied in the spring assembly 13 of two pairs of rear wheels 14, 14a; 15 and 15a of a semi-trailer 16.

The rock shafts 1 and 2 extend under and transversely of the rear portion of the chassis 17 of said semi-trailer 16, and the rock shaft 1 is journaled in a pair of bearings 18 suspended from the side members 19, respectively, of said chassis on bearing plates 20, which are secured to the outer sides of said chassis side members, respectively, by screw bolts 21.

In the forked ends 6 of the rock shaft connecting arms 3 are pivotally connected, by means of bolts 22 and nuts 23, the forward ends, respectively, of the semi-elliptic springs 24, of said spring assembly 13, which springs are mounted on the axle 25 of the rearmost pair of wheels 14 and 14a of said rear wheels of said semi-trailer 16, the rear ends of said springs being pivotally connected to the lower ends of shackles 26, respectively, which shackles are pivotally connected at their upper ends to brackets 27, respectively, secured on the outer sides of the side members 19, respectively, of the chassis 17 of said semi-trailer 16.

In the forked ends 8 of the rock shaft connecting arms 4 are pivotally connected, by means of bolts 28 and nuts 29, the rear ends, respectively, of the semi-elliptic springs 30 of said spring assembly 13, which springs are mounted on the axle 31 of the foremost pair of wheels 15 and 15a of said rear wheels of said semi-trailer 16, the forward ends of said springs being pivotally connected to the lower ends of shackles 32, respectively, which shackles are pivotally connected at their upper ends to brackets 33, respectively, secured on the outer sides of the side members 19, respectively, of the chassis 17 of said semi-trailer 16.

The operation, uses and advantages of my invention are as follows:

In traveling over rough roads, either wheel 14 or 14a may be moved up or down independently of the other wheel 14 or 14a, since the arm 3 connected to the forward end of one semi-elliptic spring 24 is secured on one end of the rock shaft 1, while the arm 3 connected to the forward end of the other semi-elliptic spring 24 is secured on the opposite end of the rock shaft 2, and each of said rock shafts and the arm 3 secured thereon may turn independently of the other rock shaft and the arm 3 secured thereon, to permit up and down movement of the forward end of each of said springs independently of the forward end of said other spring; and either wheel 15 or 15a may be moved up or down independently of the other wheel 15 or 15a, since the arm 4 connected to the rear end of one semi-elliptic spring 30 is secured on one end of the rock shaft 1, while the arm 4 connected to the rear end of the other semi-elliptic spring 30 is secured on the opposite end of the rock shaft 2, and each of said rock shafts and the arm 4 secured thereon may turn independently of the other rock shaft and the arm 4 secured thereon, to permit up and down movement of the rear end of each of said springs 30 independently of the rear end of the other spring 30.

When either wheel 15 or 15a travels over a depression in the road, said wheel is relieved from sustaining vehicle load in some proportion which is related to the depth of the depression, for the reason that one of the wheels 14 or 14a is in part sustaining the load. Specifically, the relationship is such that if wheel 15a drops into a depression, the spring 30 therefor will flex to permit the wheel to follow the contour of the depression but in so doing, the vehicle load will be sustained by wheels 14a and 15. It is evident that when wheel 15a drops within the depression and spring 30 therefor flexes, its arm 4 is rocked which in turn produces torque on shaft 1 to rotate arm 3 and elevate the forward end of spring 24 associated with wheel 14. It, therefore, follows that the principal load is supported by wheels 14a and 15. Any wheel entering any depression will, therefore, have the same action as just described, in that its companion wheel on the same side of the vehicle will sustain the load in cooperation with a diagonally opposite wheel, which is to say, by way of example, that if wheel 14 dropped into a depression, then wheel 15 and the wheel diagonal to wheel 15, to-wit, wheel 14a, would sustain the load.

Assuming a second operation wherein a vehicle wheel strikes an elevation in the road, and using the same wheel 15a, said wheel would be elevated to compress its spring 30 which would rock arm 4 connected with said spring upwardly or in a clockwise direction, thereby rotating shaft 1 to produce downward movement of arm 3 associated with spring 24 for wheel 14. This movement is such as to move wheel 14 downwardly and compensate in this respect for the compression of spring 30 associated with wheel 15a, while wheels 14a and 15 substantially equally support the vehicle load.

Torque in either rocker shaft 1 or 2 functions as a shock absorber for the vehicle when the wheels move within depressions or over raised portions in the road, due to the manner of connecting said rocker shafts to biased positioned wheels as heretofore set forth.

The flexing of the semi-elliptic springs 24 and 30, under the weight of the load on the chassis 17 of the vehicle 16, which swings the rocker arms 3 and 4 upwardly, is limited by the engagement of the stop lugs 5 and 7 on the upper edges of the rocker arms 3 and 4, respectively, as shown in Figures 4 and 5 of the drawing. The rocker arms 3 and 4, and their stop lugs 5 and 6 on either side of the chassis 17 function as a means for distributing the load on the pair of wheels on a corresponding side of the chassis, when the load of the vehicle flexes the pair of springs 24 and 30 for said pair of wheels to a predetermined degree, as determined by the engagement of the stop lugs 5 and 6 on the rocker arms 3 and 4 connected to said pair of springs.

With my spring assembly, a vehicle may be spring-mounted on two pairs of wheels in such manner as to provide independent spring action of the two wheels on each side of the vehicle, and related action of the biased-connected wheels positioned diagonally on opposite sides of the vehicle.

My invention, while shown applied to a semi-trailer, is not limited to that type of vehicle, but may be applied to other types of vehicles such, for example, as trucks.

The use of my invention enables vehicles to travel more smoothly than otherwise over rough roads.

I claim:

1. In combination with the semi-elliptic springs of a spring assembly for two pairs of wheels supporting a vehicle, means for mounting said wheels on said semi-elliptic springs to provide independent spring action of the wheels of each pair, and related spring action of the wheels of said pairs, which are arranged diagonally opposite each other, and means for distributing the load on the same side of each pair of wheels when the springs for said side of the wheels are flexed to a predetermined degree.

2. In combination with the semi-elliptic springs of a spring assembly for two pairs of wheels supporting a vehicle, a tubular rock shaft suitably journaled on said vehicle, a second rock shaft extending through and journaled in said tubular rock shaft, a pair of rocker arms secured, respectively, on one end of said tubular rock shaft and on the opposite end of said second rock shaft, with the ends of said rocker arms pivotally connected to the forward ends of the semi-elliptic springs, respectively, of the axle of the rearward pair of said wheels, a pair of rocker arms secured, respectively, on the other end of said tubular rock shaft and on the other end of said second rock shaft, with the ends of said arms pivotally connected to the rear ends of the semi-elliptic springs, respectively, of the axle of the forward pair of said wheels, and stop lugs on the rocker arms arranged so that said lugs on the arms secured on the ends of one rock shaft will engage the lugs on the arms secured on the ends of the other rock shaft for distributing the load on the same side of each pair of wheels.

3. In combination with the semi-elliptic springs of a spring assembly for two pairs of wheels supporting a vehicle, a rock shaft suitably journaled on said vehicle, a second rock shaft suitably journaled on said vehicle, a pair of rocker arms secured, respectively, on one end of said first rock shaft and on the opposite end of said second rock shaft, with the ends of said arms pivotally connected to the forward ends of the semi-elliptic springs, respectively, of the axle of the rearward pair of said wheels, a pair of rocker arms secured, respectively, on the other end of said first rock shaft and on the other end of said second rock shaft, with the ends of said arms pivotally connected to the rear ends of the semi-elliptic springs, respectively, of the forward pair of said springs, and stop lugs on the rocker arms arranged so that said lugs on the arms secured on the ends of one rock shaft will engage the lugs on the arms secured on the ends of the other rock shaft for distributing the load on the same side of each pair of wheels.

JOHN CHARLES JUNKIN.